United States Patent [19]

Khalifa et al.

[11] Patent Number: 4,891,990
[45] Date of Patent: Jan. 9, 1990

[54] VORTEX FLOWMETER TRANSDUCER

[75] Inventors: Mohamed Khalifa, Peachtree City, Ga.; John Manwell, Liverpool, United Kingdom

[73] Assignee: Schlumberger Industries, Inc., Atlanta, Ga.

[21] Appl. No.: 271,490

[22] Filed: Nov. 15, 1988

Related U.S. Application Data

[63] Continuation-in-part of Ser. No. 129,123, Dec. 4, 1987, Pat. No. 4,864,868.

[51] Int. Cl.⁴ .............................................. G01F 1/38
[52] U.S. Cl. .................................................. 73/861.24
[58] Field of Search ...................................... 73/861.24

[56] References Cited
U.S. PATENT DOCUMENTS 3,972,232  8/1976  Miller et al. ..................... 73/861.24
4,161,878  7/1979  Fussell, Jr. ....................... 73/861.24
4,648,280  3/1987  Miyoshi et al. .................. 73/861.24

Primary Examiner—Herbert Goldstein
Attorney, Agent, or Firm—Dale V. Gaudier

[57] ABSTRACT

A vortex flowmeter including a differential pressure transducer with high common mode rejection. No diaphragms are required. A relatively thick machined recess at one end of the vortex shedding body concentrates and transmits the vortex shedding differential pressure to strain transducers located outside the fluid flow conduit. Embodiments are disclosed in which piezoelectric elements and reflective optical fibers are used as strain transducers. The described arrangements allow the mechanical clamping of the transducers and their easy removal without a flow shut down. The shedder shape is optimized in relation to the differential transducer to strengthen the shed vortices and improve the linearity and repeatability of the meter.

15 Claims, 6 Drawing Sheets

VORTEX FLOWMETER TRANSDUCER

CROSS REFERENCE TO RELATED APPLICATIONS

This application is a continuation in part of Ser. No. 129,123 filed December 4, 1987 entitled Vortex Flowmeter Transducer now U.S. Pat. No. 4,864,868.

BACKGROUND OF THE INVENTION

1. Field of the Invention

The invention relates to the field of vortex flowmeters and, more particularly, to a design for a differential pressure transducer for use with a vortex flowmeter which requires no fill fluids, and which utilizes mechanical clamping of the vortex sensing elements.

2. Description of the Prior Art

The phenomenon of vortex shedding occurs over a certain Reynolds number range when a fluid (gas or liquid) flows past a bluff (non-streamlined) body. In a two-dimensional flow, the vortices formed on the opposite sides of the body rotate in an opposite sense from each other and form a regular geometrical pattern called the Karman vortex street. The convection velocity of this geometrical pattern is directly related solely to the approaching stream velocity. This means that the shedding frequency is proportional to the flow rate regardless of the fluid properties. The detection of the number of vortices shed per unit time (the vortex shedding frequency) and not its strength, is the prime measurement property of interest.

The role played by the interaction of the two shear layers on the sides of the bluff body is central in explaining the phenomenon of the alternation of vortex shedding. This was explained by J. H. Gerrard (1966) in *Journal of Fluid Mechanics*, 25, 401–413. A vortex spiral forms on either side of the wake of a bluff body or strut as a result of the shear layer instability. The vortex spiral continues to grow (see, for example, FIG. 4) until it is strong enough to draw the opposing shear layer across the near wake. The arrival of an oppositely signed vortex starts to weaken the ability of the spiral to draw vorticity from its connected shear layer. This allows the growing vortex to separate and move downstream. The bent shear layer from the other side that was sucked into the side of the spiral then begins to feed its own spiral on the opposite side of the strut. The presence of the strut between the two shear layers is essential for this alternation mechanism to work. This fact emphasizes the critical role played by the extent and shape of the back of the strut.

Vortex shedding results in alternating pressure depression on the two sides of the strut. A number of different techniques to detect the alternation frequency have been proposed. The cooling effect of the pressure depression or of a resulting induced flow that tries to restore the pressure balance is used in thermal sensors. Thermal sensors rely on having a heated element in the flow. This represents a potential hazard. The signal is often noisy and requires complicated electronic conditioning. The transducer element is delicate and subject to the aging process. The main advantage of thermal sensors is high sensitivity with a good time response.

In another technique, shuttle elements (discs, balls, etc.) are placed in a cavity that connects the two strut sides and move due to the induced flow that results from the pressure imbalance created by vortex shedding. Several proximity transducers to detect the movement of a shuttle element are available. The electronics are relatively simple when compared to thermal sensors. However, these techniques require passageways with openings that are susceptible to clogging and build-up of debris. The presence of a moving mechanical element limits the transducer time response and its fatigue cycle. The passageway is a leakage passage that affects the shedding process. In light of Gerrard's model (see above) that explains the alternation of vortex shedding, this leakage effect accelerates the equalization of the differential pressure, i.e. it increases the meter's K-factor (the number of pulses per total volume of fluid flowing through the meter). The leakage effect has a dependency on the fluid properties. In oscillating discs, thermal shocks can lead to serious distortions and damage to the disc.

In trying to eliminate the ports and the leakage passage used with shuttle elements, several proposals call for using diaphragms to seal the cavity of the shuttle element. A sealed shuttle element allows, in addition to proximity transducers, the use of a wider variety of strain transducers. Thin diaphragms are susceptible to thermal and pressure shocks. Often, an oil-filled cavity is used to support the diaphragms without serious damage to the response time of the sensor. Thermal expansion and phase change conditions limit the application range of an oil-filled cavity. In both the cases of an oil or atmospheric air filled cavity, a damaged diaphragm can lead to releasing the flow fluid to the outside environment. With few exceptions, such as shown in U.S. Pat. No. 4,475,405, the replacement of the transducer requires depressurizing the flow line.

More recently, a proposal described in U.S. Pat. No. 4,625,564 calls for using a fin in the passageway. The deflection of the fin activates strain transducers.

Other proposals describe techniques to measure the integrated pressure depression along the side areas of the strut. This results in alternating lift and drag forces. The pivoting of the strut isolates either a bending force or a torsional torque from a shearing force. The integration of the stress along the strut increases the complexity of the design, since the noise generated anywhere along the strut needs to be eliminated. U.S. Pat. No. 4,437,350 outlines the use of piezoelectric elements to sense the minute strains due to the micro-bending of the pivoted strut. The piezoelectric elements are embedded (e.g. cemented) within the strut itself. If the piezoelectric elements fails the whole strut must be replaced. The removal of the strut requires a flow shut down. The clamping of the element is not mechanical. This makes the arrangement more expensive and more susceptible to loss of signal if the cement softens, such as might occur at higher temperatures. U.S. Pat. No. 4,699,012 describes a vortex sensing member disposed downstream of the vortex generator and parallel to it. The sensing member has a slender midsection to sense the lift forces downstream of the vortex generator. Different end support arrangements are proposed to suppress noise and amplify the vortex shedding effect.

In an alternative approach, the alternating drag forces are used to exert a micro-twist upon a torque tube located downstream of a primary shedder. The strains are transmitted through a link to piezoelectric sensing elements outside the flow.

There are other known techniques capable of detecting the vortices downstream of a shedder such as those which use ultrasonic transducers.

There is a need for an inexpensive and simple design for a differential pressure transducer for use with a vortex flowmeter. Local measurements rather than integrated ones are desirable since they tend to be less noisy. A mechanically clamped transducer design is simpler and more serviceable than welded or cemented ones. A non-welded sensor that can be replaced without depressurizing the flow line possesses a clear advantage. The elimination of all leakage passages and ports shown in some types of prior art devices not only would avoid clogging of these passages with debris, but it also would result in a more linear output independent of the fluid properties. Another important property of a sensor for a vortex flowmeter is the ability to reject common-mode noise, i.e. vibrations due to sources other than the alternating vortices shed by the bluff body or strut.

SUMMARY OF THE INVENTION

A differential pressure sensor for a vortex flowmeter with a high common-mode rejection relies on sensing the stresses on a thinned portion of a shedding body. The body is T-shaped with the head of the T arranged perpendicular to the direction of fluid flowing in a conduit. The body is formed by machining or casting and includes a pair of thinned circular areas or recesses which are arranged on opposite sides of the upright portion of the T to receive the impact of vertices shed by the body. The machined recessed in the body are superior to prior art welded thin diaphragms in resisting thermal and pressure shocks.

The body is placed in fluid flowing in a conduit with the two sides of the upright thin portion of the T under the static line pressure. The differential pressure at the thinned portion is transmitted to a cavity formed at one end of the body and disposed outside the conduit. A pair of strain transducers are arranged in contact with a wall of the cavity and on opposite sides of a plane containing the upright portion of the T-shaped body. The strain transducers are responsive to flexing induced in the cavity wall caused by impacts of vortices shed by the body against the thinned portion of the body.

The use of two transducers mechanically coupled to opposite sides of the body reduces the sensitivity of the transducers to common-mode vibrations. The transducers sense the minute out-of-phase strains on the two sides of the body. The common mode noise that results from pump or line vibrations affects the two transducers simultaneously in phase. The subtraction of the output of the two transducers amplifies the out-of-phase differential shedding signal and the cancellation of the common mode noise. This differential signal is a series of pulses whose frequency is proportional to the velocity of the fluid flowing in the conduit. The pulses may be counted to give a visual indication of the flow rate, after appropriate scaling.

In one embodiment, the strain transducers are two piezoelectric elements which are mechanically clamped adjacent to or into contact with the wall of the cavity. The mechanical clamping means may include means for electrically connecting the piezoelectric elements to a differential detection circuit. In a second embodiment the strain transducers are two or more optical fibers having reflective ends adjacent to or in contact with the cavity wall. Movement of the cavity wall causes a beam of light which is guided through the fibers to be displaced (i.e. not reflected). The light beam is thus periodically reflected back along the axis of the fiber. These perodic alternations of the intensity of the reflected beam can be detected by a photodetector and turned into a series of electrical pulses which can be counted and displayed.

Other strain transducers, like micro-bending optical fibers, capacitive and resistive strain gages and the like, can be used.

The foregoing arrangements enable the vortex sensing elements to be located in a dry area outside the fluid flow conduit. The vortex sensing elements can be readily removed and changed without a flow shut down. The shape of the vortex generator (shedding body or strut) is optimized to generate vortices with enough energy to excite the vortex sensing elements and maintain a high degree of linearity and repeatability of the sensing of the vortices.

BRIEF DESCRIPTION OF THE DRAWING FIGURES

These and other features and advantages of the present invention will be more clearly understood from the following detailed description of the preferred embodiments of the invention when taken with the accompanying drawing figures wherein.

Figure 1:
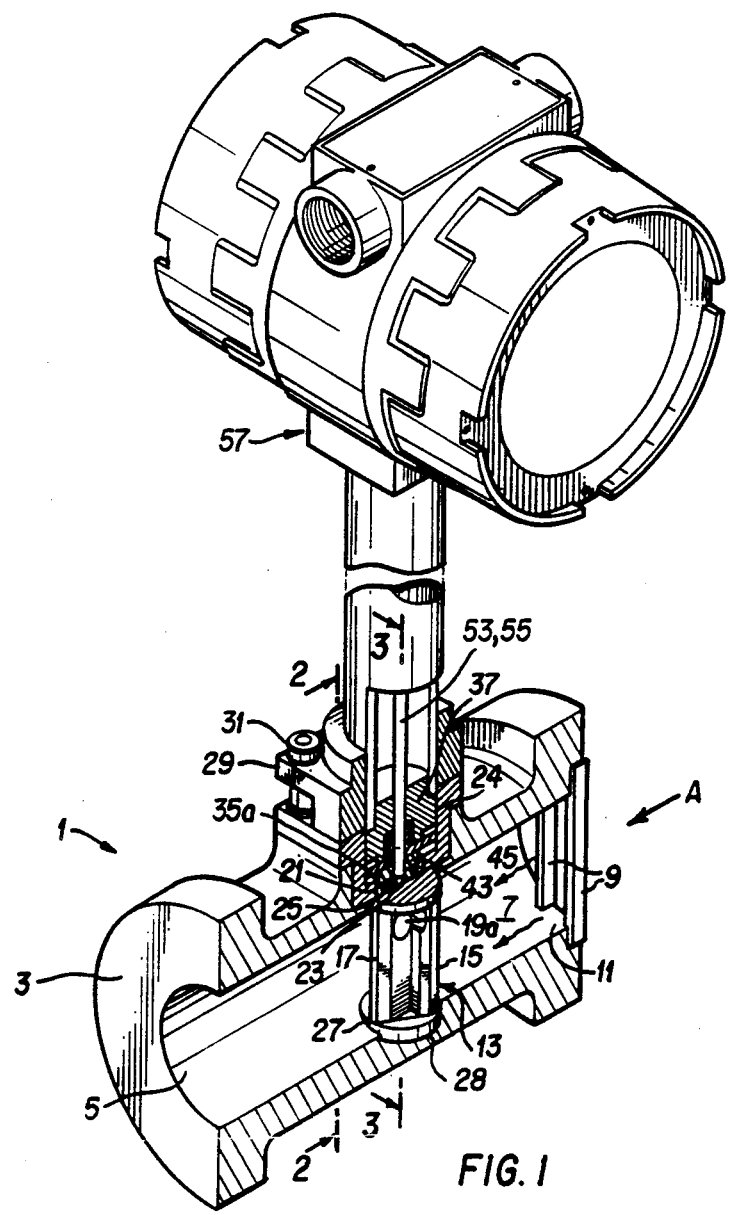
FIG. 1 is a broken perspective view of a vortex flowmeter and differential transducer constructed in accordance with a first enrollment the present invention.
Figure 2:
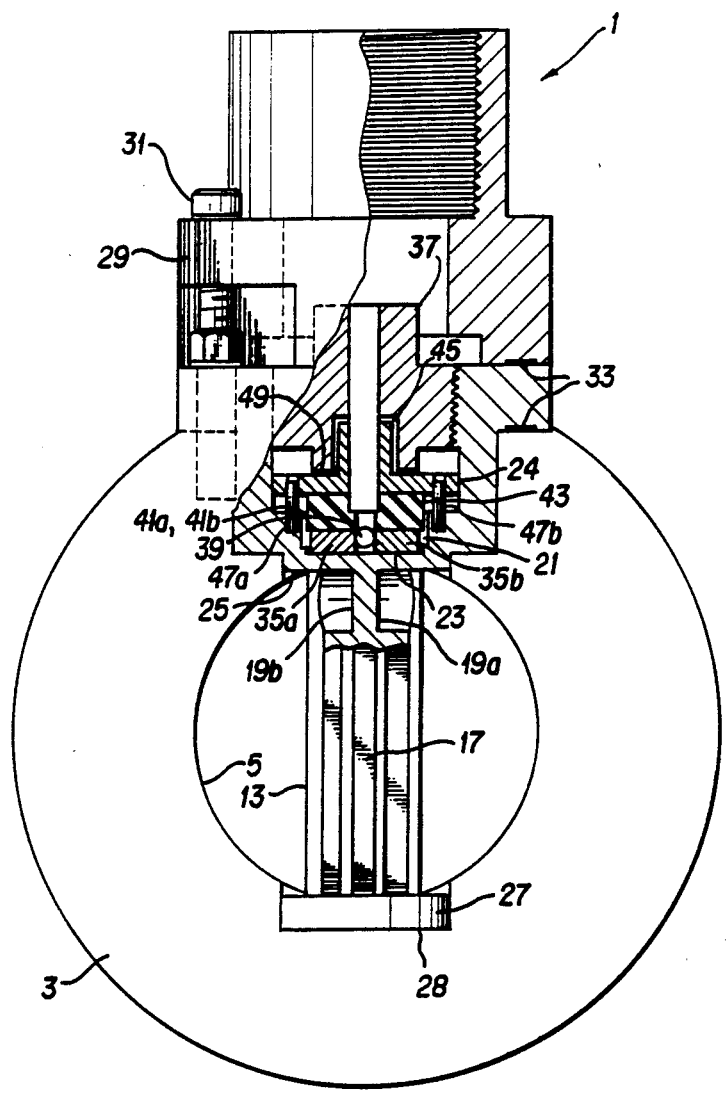
FIG. 2 is a cross-sectional view of the flowmeter and transducer of FIG. 1 taken along lines 2—2.
Figure 4A:
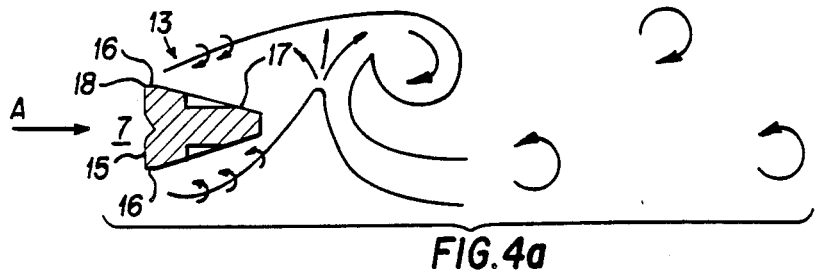
Figure 4B:
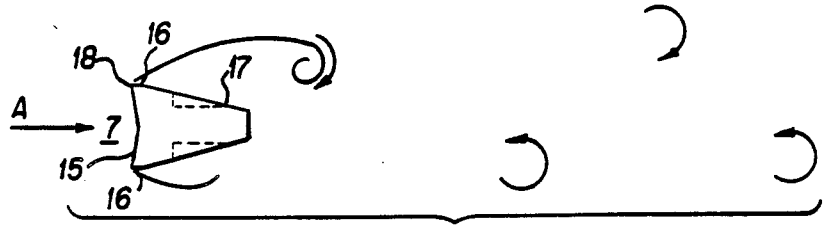
Figure 8:
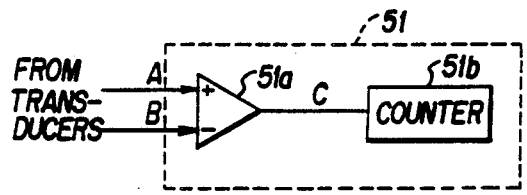
Figures 8A, 8B:
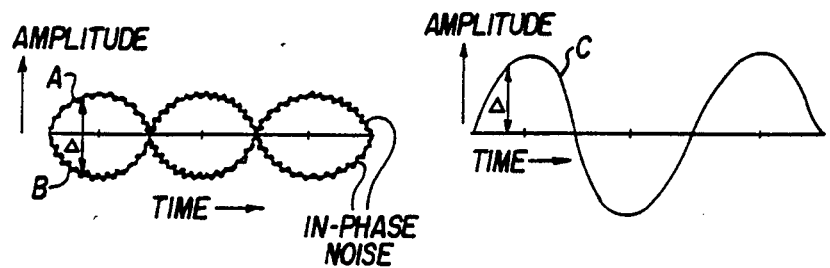
Figure 5:
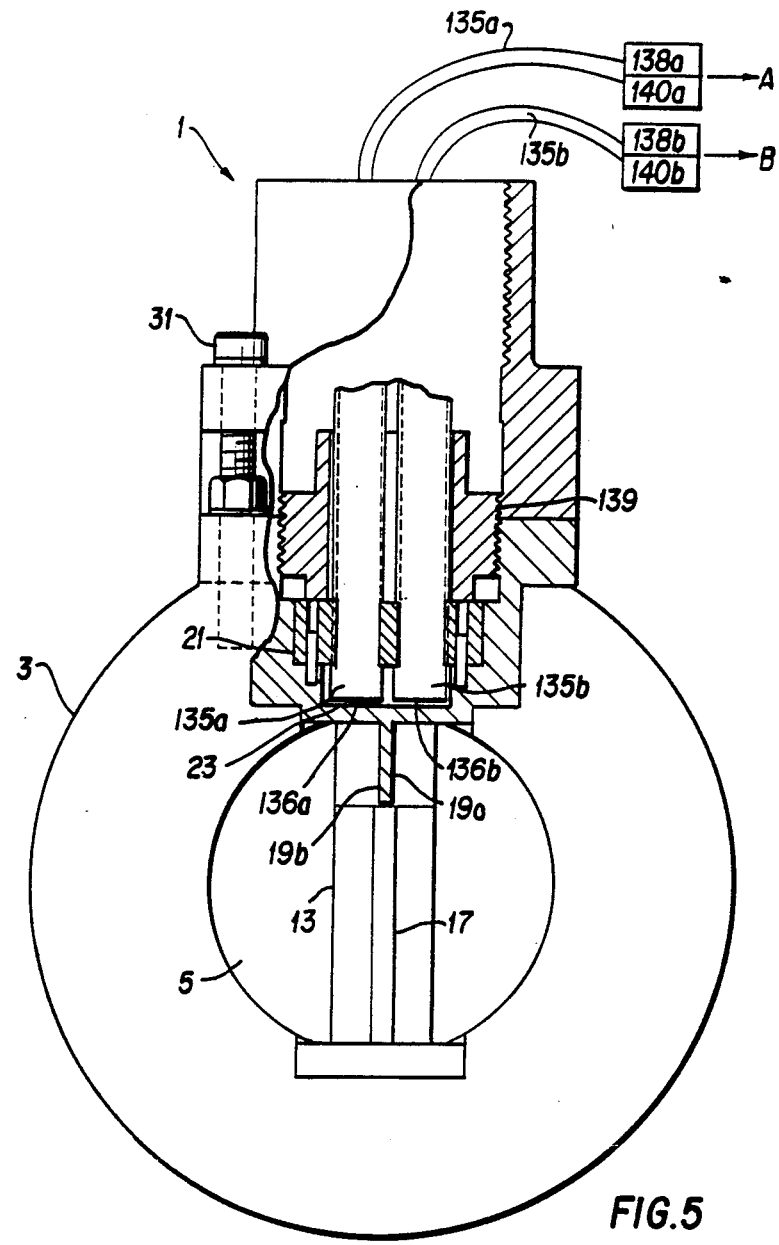
Figure 6:
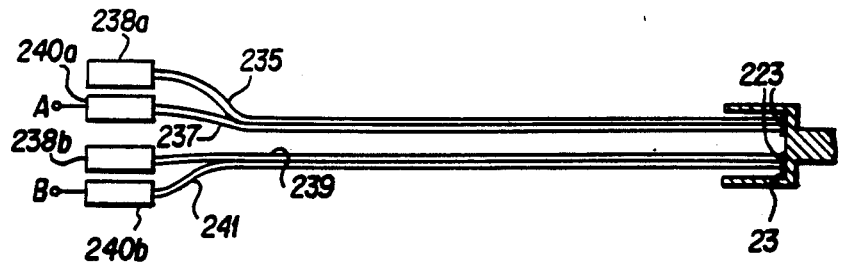
Figure 7:
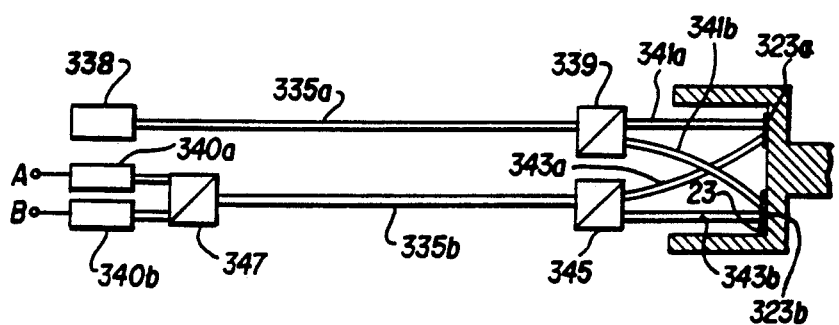

FIGS. 4a and 4b and are top cross-sectional plan views of two alternative shapes a shedding body that can be used with the flowmeter of FIG. 1;

FIG. 5 is similar to FIG. 2 but shows an alternative transducer arrangement utilizing fiber optic sensors;

FIG. 6 schematically shows an alternative optical fiber transducer arrangement similar to FIG. 5;

FIG. 7 schematically shows yet another alternative optical fiber transducer arrangement similar to FIG. 5; and FIG. 8 shows one type of circuit which can be used with the transducers of FIGS. 2, 3, 5, 6, or 7 for providing a flowrate measurement, FIG 8a shows the signals output by the transducers, and FIG. 8b shows the signal output by the circuit.

DETAILED DESCRIPTION OF THE PREFERRED EMBODIMENTS

Figure 3:
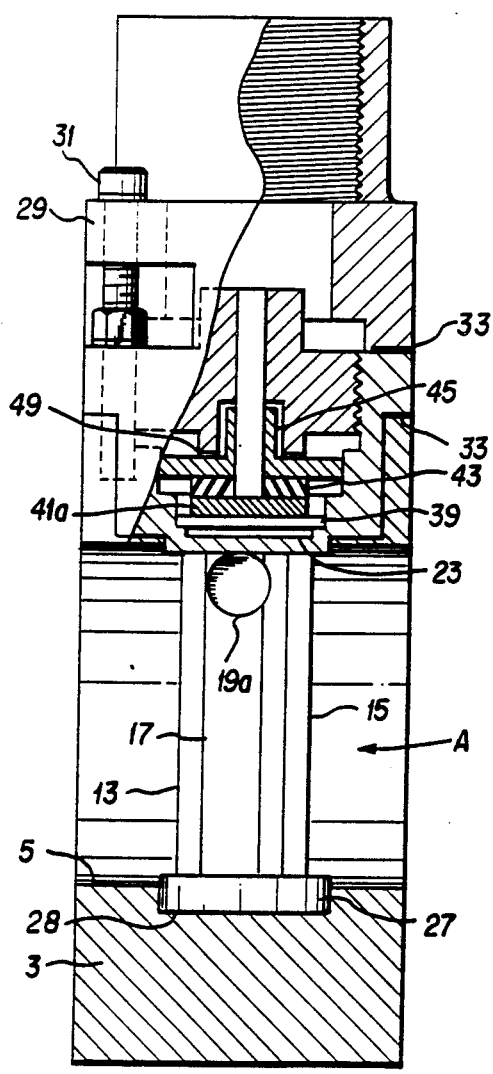
FIG. 3 is a cross-sectional view of the flowmeter and transducer of FIG. 1 taken along lines 3—3.

Referring to FIGS. 1, 2 and 3, a vortex flowmeter 1 according to a first embodiment of the invention comprises a conduit 3 having a central bore 5 through which a fluid 7 flows in the direction indicated by arrow A. A series of flow rectifying vanes 9, which are described in more detail in copending application Ser. No. 129,122 filed December 4, 1987, are located at the entrance 11 of conduit 3.

A vortex shedding body or strut 13 having a generally T-shaped cross-section when viewed from above (see FIGS. 4a and 4b) is arranged with its long axis perpendicular to the direction A of fluid flow through conduit 3. The shape of body 13 is shown more clearly in FIGS. 4a and 4b which represent two types of shedding body shapes which can be utilized to provide proper generation of vortices resulting from the flow of fluid 7 around body 13.

The head 15 of T-shaped body 13 is arranged substantially perpendicular to the direction A of fluid flow in conduit 3. The head 15 of body 13 thus presents a blunt or non-streamlined surface which causes the generation of vortices downstream of the body in a well-known manner.

The upright portion 17 of body 13 takes the form of a rib joining head 15 at substantially right-angles along the length of the body. Upright portion 17 of body 13 is thus arranged substantially parallel to the direction A of fluid flowing in the conduit but downstream of the head.

Upright portion 17 further includes a pair of circular recesses 19a and 19b formed on opposite sides of the rib and at one end thereof. This results in a relatively thin area (with respect to the normal thickness of portion 17) between recesses 19a and 19b against which vortices caused by shedding from the surfaces of head portion 15 of body 13 may impact. The impact of these vortices is subsequently detected, in a manner to be described below.

Except for the provision of the relatively thin portion resulting from recesses 19a and 19b, the shape of body 13 which is exposed to fluid 7 may be conventional in design and may be formed from various materials, such as metals or plastics, in accordance with known principles. However, for best results, the shedding body shape should be optimized in relation with the sensing technique such that the released vortices have enough energy to excite the transducer. The linearity and the repeatability of the flowmeter output depends mainly on the geometry of the body and the design of the transducer. These two factors (body shape and transducer arrangement) are closely related and have to be optimized together. FIG. 4a shows one type of optimized shedding body shape. The front face 15 of the body 13 is shaped such that the frontal stagnation line of the approaching flow stream 7 becomes fixed with a minimum jitter. The small flat sides 16 are provided to control the width of the front face and ensure a relatively sharp edge 18 on an investment cast body.

Referring again to FIG. 1, 2, and 3, at one end of body 13 there is formed a cavity portion 21 with a wall 23 arranged approximately parallel to the direction A of fluid flowing in conduit 3. Cavity 21 further includes a circular wall 24 surrounding wall 23, which together form cavity 21.

Cavity portion 21 of body 13 fits within an opening 25 formed along a radius of conduit 3. The opposite end of body 13 includes a portion 27 which fits into a recess 28 formed in the wall of conduit 3 opposite to that of opening 25.

Body 13 is secured to conduit 3 by means of plate 29 which fits over cavity portion 21 of the body. Plate 29 is secured to conduit 3 by four threaded fasteners 31. Gasketing material 33 may be interposed between the outer portion of cavity 21 and the surface of conduit 3 where the two contact so as to provide a fluid-tight seal therebetween.

Wall 23 is arranged to receive a pair of strain transducers 35a and 35b which are arranged on opposite sides of a plane containing upright portion 17 of body 13.

The proximity of wall 23 to recesses 19a and 19b causes wall 23 to be subject to flexing due to the impact of vortices shed by head portion 15 of body 13 against recesses 19a and 19b. More particularly, a differential pressure is developed between recesses 19a and 19b due to pressure differences caused by the passage of vortices by recesses 19a and 19b. These pressure differences cause minute stresses in the portion of upright portion 17 between recesses 19a and 19b and wall 23 of cavity portion 21. These stresses, in turn, are transmitted to wall 23 and take the form of a series of variations in surface stress acting alternately on opposite sides of a plane drawn through upright portion 17 of body 13 and bisecting wall 23.

The stresses induced in wall 23 may be detected utilizing strain transducers 35a and 35b of conventional design. Preferably, however, transducer 35a and 35b are piezoelectric transducers or fiber optic reflective transducers, as discussed below.

Referring to FIGS. 1, 2 and 3 a transducer can be assembled using piezoelectric elements 35a and 35b and mechanical clamping. At the bottom of cavity portion 21, two piezoelectric elements 35a and 35b are produced from one piezoelectric disc by splitting it into two halves. The two halves are separated from each other by an electrical insulator 39. Two electrodes 41a and 41b are in contact with the top surfaces of the piezoelectric elements that have the same polarity. The two electrodes are mounted on an electric insulator 43. A flat plate 45 with two guide pins 47a and 47b helps apply the clamping pressure on the piezoelectric elements more uniformly without applying a shearing stress on them. The cavity is kept dry with the help of a seal 49.

The output of piezoelectric elements 35a and 35b is a series of electrical pulses having a frequency directly related to the flow rate of the fluid in conduit 3.

FIG. 5 shows an alternative transducer arrangement utilizing a pair of reflective optical fibers. More particularly, a pair of optical fibers 135a and 135b are held within cavity 21 by means of fiber guide 137 which fits within cavity 21. The ends 136a and 136b of optical fibers 135a and 135b are reflective and are located firmly by fiber guide 137 adjacent to wall 23 on opposite sides of a plane containing upright portion 17 of body 13 and bisecting wall 23. Ends 136a and 136b of the optical fibers are pressed against wall 23 by means of bushing 139 which presses against guide 137.

A pair of light emitters 138a, 138b, and light detectors 140a, 140b are associated with the opposite ends of optical fibers 135a and 135b, as shown in FIG. 5.

Normally, light emitted by a light emitter 138a 138b is transmitted down its associated optical fiber, 135a or 135b, and reflected at ends 136a or 136b along the axis of the fiber back to light detectors 140a or 140b, respectively. However, flexing of wall 23 induced by impacts of vortices shed by body 13 against recessed areas 19a and 19b causes the reflective ends 136a and 136b to be offset slightly from their normal perpendicular relationship to the axis of their associated optical fibers. This results in a periodic variation in the light intensity reflected back to light detectors 140a and 140b. Light detectors 140a and 140b, which for example are photodiodes, produce an electrical output which is a series of time varying electrical signals or pulses having a frequency directly related to the flow rate of the fluid in conduit 3.

FIGS. 6 and 7 show alternative embodiments of the optical fiber transducer shown in FIG. 5. For the sake of clarity, the optical fibers, light emitters, light detectors and wall 23 of the cavity portion 21 of body 13 are shown only schematically. In FIG. 6, two pairs of optical fibers 235,237 and 239,241 are utilized for transmitting light emitted from light emitters 238a and 238b and for receiving light reflected from wall 23 (which may include one or more reflective portions 223 thereon) by means of light detectors 240a and 240b. Light emitters 238a, 238b and light detectors 240a and 240b are similar in structure and function to light emitters and detectors 138a, 138b and 140a, 140b described above with respect to FIG. 5.

FIG. 7 shows yet another version of an optical fiber transducer utilizing a pair of optical fibers 335a and 335b, a single light emitter 338, a first wavelength splitter 339, a pair of optical input fibers 341a and 341b, reflective portions 323a and 323b formed on wall 23, a pair of optical output fibers 343a and 343b, a beam combiner 345, a second wavelength splitter 347, and a pair of light detectors 340a and 340b. Light emitter 338 emits light of more than one frequency and is transmitted over optical fiber 335a to wavelength splitter 339. Wavelength splitter 339 splits the transmitted light into two wavelength groups, with one group being transmitted via optical input fiber 341a to reflective portion 323a of wall 23 and the other group being transmitted via optical input fiber 341b to reflective portion 323b. Light reflected from reflective portions 323a and 323b is transmitted via optical output fibers 343a and 343b, respectively, to beam combiner 345 which acts like wavelength splitter 339, but in reverse. The combined light beam is transmitted via optical fiber 335b to wavelength splitter 347 which separates the two beams again and applies them to respective light detectors 340a and 340b. The signals from light detectors 340a and 340b are processed similarly to that described above with respect to FIG. 5.

FIG. 8 shows an arrangement for sensing the outputs A and B of transducers 35a and 35b of FIGS. 1, 2 and 3, or the optical transducers shown in FIGS. 5-7. A circuit 51 for sensing the outputs of the transducers is connected by wires 53 and 55 to electrodes 41a and 41b respectively. Circuit 51 may be housed in housing 57 (see FIG. 1) or located remote from flowmeter 1 and consists essentially of a difference amplifier 51a which outputs a signal C whenever there is difference (Δ) between the signals at its input. Since the transducers are normally subject to stresses of opposite phase but of similar magnitude (due to the impact of vortices on body 13 transmitted to cavity wall 23), the outputs A and B of the transducers will be of opposite sign but of similar magnitude. Applied to the inputs of circuit 51, this results in an output signal C which is the difference (Δ) between the two input signals. This output signal C has essentially double the magnitude of any one of the signals A or B produced by a transducer. The in-phase noise drops out due to the subtraction performed by difference amplifier 51a, as shown in FIG. 8b. Furthermore, the signal output by circuit 51 takes the form of a series of pulses (see FIG. 8) since the outputs of the transducers are a series of approximately sinusoidal waves of approximately equal magnitude but 180 degrees out of phase with each other, as shown in FIG. 8a. These pulses may be counted by a counter 51b to determine their frequency over a predetermined time period. The pulse frequency is directly proportional to the velocity (flowrate) of the fluid flowing in conduit 3. The pulses output by circuit 51 may be used to drive a counter or other display of conventional design disposed in housing 57.

The circuit of FIG. 8 may be utilized with the reflective optical fiber arrangement of FIGS. 5, 6 or 7 by sensing the outputs A and B of light detectors 140a and 140b (or 240a, 240b, or 340a, 340b) since they produce output signals similar to those output by transducers 35a and 35b of FIGS. 1, 2 and 3. These output signals are processed by circuit 51 in the same fashion as described above with respect to FIG. 8.

It will be appreciated that, because of the arrangement of body 13, recesses 19a and 19b, cavity 21 and wall 23, the outputs of transducers 35a and 35b (or the optical transducers shown in FIGS. 5, 6, or 7) are affected in an opposite sense only when there is a difference in pressure against upright portion 17 of body 13 caused by the impact of vortices shed by body 13. This means that the vortex transducers will exhibit very high common mode rejection. That is, stresses caused by external vibrations or forces acting on the conduit or transducer, will effect both transducers equally and in phase. The outputs of the transducers will therefore be in phase and of similar amplitude. Since circuit 51 is responsive only to differences in the outputs of the transducers, signals due to common mode vibrations will result in no output from circuit 51.

The two described transducer arrangements (piezoelectric and optical fibers) give high signal levels for both liquid and gas flows. Other ways based on the flexure of an optical fiber (like microbending, speckle pattern, etc.) may also be used to produce modulated signals that can be subtracted to cancel common mode signals in the same way described above.

A further advantage of the invention is that the transducers may be easily removed and/or replaced without the need to shut down fluid flowing in conduit 3. This is because the transducers are located in cavity 21 which is on the "dry" side of conduit 3, i.e. outside the bore 5 where fluid 7 flows. Also, the transducers are not permanently sealed within cavity 21 but only clamped, making removal of the transducers for repair or replacement easy. Furthermore the shedding body is designed without any openings where debris may accumulate and is rugged in shape and design. The shedding body may be removed from conduit 3 through opening 25 if necessary for maintenance or inspection.

While the present invention has been described in considerable detail, it will be understood that various modifications and alternatives would occur to those skilled in the art. Accordingly, the foregoing is intended to be descriptive but not limitive of the invention which is defined by the following claims.

What is claimed is:

1. A vortex flowmeter comprising:
   a conduit for confining a fluid flowing therein;
   a vortex shedding body having a portion placed within the conduit for generating vortices from fluid flowing past the body;
   the body including a recessed portion having a surface which is subject to impact from the vortices generated by fluid flowing past the body;
   the body further including a cavity portion located at one end thereof and outside the conduit, the cavity having a wall subject to alternate flexing caused by forces transmitted from the surface of the recessed portion of the body to the cavity portion of the body due to the impact of the vortices on the surface of the recessed portion of the body; and
   means for sensing the flexing of the wall of the cavity including;
   (a) at least one light source;
   (b) light detection means;
   (c) reflective means disposed on the wall portion of the cavity and;

(d) optical fiber means for transmitting light from the light source to the reflective means and to the light detection means;

the flexing of the wall of the cavity causing an output from the sensing means which represents the difference between the amplitude of the alternate flexing of the wall caused by impact of the vortices generated by the body.

2. The flowmeter of claim 1 wherein the body is unitary and the cavity and recessed portion of the body are formed by machining of the body.

3. The flowmeter of claim 1 wherein the conduit includes an opening formed along a radius thereof for receiving the cavity portion of the body and wherein the recessed portion of the body is arranged within the conduit and in contact with the fluid.

4. The flowmeter of claim 1 wherein the portion of the body within the conduit has a generally T-shaped cross-section in a plane parallel to the direction of fluid flow in the conduit, with the head of said T-shaped section arranged substantially perpendicular to the direction of fluid flow in the conduit to present a blunt surface thereto and the upright portion of said T-shaped section arranged substantially parallel to the direction of fluid flow in the conduit.

5. The flowmeter of claim 4 wherein said upright portion of said T-shaped section includes two circular recessed sections formed on opposite sides of the upright portion and proximate the wall of the cavity portion.

6. The flowmeter of claim 1, including means for detecting the alternating electrical output of the light detection means and for producing a signal which is the difference between the amplitude of the signal output by each light detection means and wherein the frequency of the difference signal is proportional to the velocity of fluid flowing in the conduit past the body, whereby detection of common mode vibrations induced in the body is minimized.

7. The flowmeter of claim 1 wherein the sensing means includes a pair of light sources and a pair of light detectors, a first light source and light detector being coupled to one of a pair of reflective portions provided on the wall portion of the cavity by means of a pair of optical fibers and a second light source and light detector being coupled to a second of the pair of reflective portions by means of a second pair of optical fibers, whereby the transmission of light from the light sources to the light detectors is affected by the alternate flexing of the cavity wall and produces an alternating electrical output of the light detectors, the frequency of the alternating electrical output being proportional to the velocity of the fluid flowing in the conduit past the body.

8. The flowmeter of claim 1 wherein the sensing means includes one light source and a pair of light detectors, the light source emitting light of more than one wavelength, wherein the light from the light source is transmitted over an optical fiber to a wavelength splitter disposed proximate the cavity portion of the body, the wavelength splitter splitting the light into two beams which in turn are transmitted via a pair of optical input fibers to respective ones of a pair of reflective portions provided on the wall portion of the cavity, the light reflected from the reflective portions being transmitted to a beam combiner disposed proximate the cavity of the body via a pair of optical output fibers, light transmitted by the optical output fibers being combined in the beam combiner and transmitted over a second optical fiber to another wavelength splitter disposed proximate the light source and light detectors, this other wavelength splitter splitting the light into two beams which are detected by the light detectors, whereby the transmission of light from the light source to the light detectors is affected by the alternate flexing of the cavity wall and produces an alternating electrical output of the light detectors, the frequency of the alternating electrical output being proportional to the velocity of the fluid flowing in the conduit past the body.

9. A vortex flowmeter comprising:
a conduit for confining a fluid flowing therein;
a vortex shedding body having a portion placed within the conduit for generating vortices from fluid flowing past the body;
the body including a recessed portion which is subject to impact from the vortices generated by fluid past the body;
the body further including a cavity portion located at one end thereof and outside the conduit, the cavity having a wall subject to alternate flexing caused by the impact of the vortices on the recessed portion of the body;
means for sensing the flexing of the wall of the cavity including:
(a) at least one light source;
(b) light detection means;
(c) reflective means disposed on the wall portion of the cavity; and
(d) optical fiber means for transmitted light from the light source to the reflective means and then to the light detection means; and
means for detecting an alternating electrical output of the light detection means and for producing a signal which is the difference between the amplitude of the signal output by the light detection means and wherein the frequency of the difference signal is proportional to the velocity of fluid flowing in the conduit past the body, whereby detection of common mode vibrations induced in the body is minimized.

10. A vortex flowmeter comprising:
a conduit for confining a fluid flowing therein;
a vortex shedding body having a portion placed within the conduit for generating vortices from fluid flowing past the body;
the body including a recessed portion which is subject to impact from the vortices generated by fluid flowing past the body;
the body further including a cavity portion located at one end thereof and outside the conduit, the cavity having a wall subject to alternate flexing caused by the impact of the vortices on the recessed portion of the body; and
means for sensing the flexing of the wall of the cavity including:
a pair of light sources and a pair of light detectors, a first light source and light detector being coupled to one of a pair of reflective portions provided on the wall portion of the cavity by means of a pair of optical fibers and a second light source and light detector being coupled to a second of the pair of reflective portions by means of a second pair of optical fibers, whereby the transmission of light from the light sources to the light detectors is affected by the alternate flexing of the cavity wall and produces an alternating electrical output of the light detectors, the frequency of the alternating electrical output being proportional to the velocity of the fluid flowing in the conduit past the body.

11. A vortex flowmeter comprising:

a conduit for confining a fluid flowing therein;

a vortex shedding body having a portion placed within the conduit for generating vortices from fluid flowing past the body;

the body including a recessed portion which is subject to impact from the vortices generated by fluid flowing past the body;

the body further including a cavity portion located at one end thereof and outside the conduit, the cavity having a wall subject to alternate flexing caused by the impact of the vortices on the recessed portion of the body; and means for sensing the flexing of the wall of the cavity including:

one light source and a pair of light detectors, the light source emitting light of more than one wavelength, wherein the light from the light source is transmitted over an optical fiber to a wavelength splitter disposed proximate the cavity portion of the body, the wavelength splitter splitting the light into two beams which in turn are transmitted via a pair of optical input fibers to respective ones of a pair of reflective portions provided on the wall portion of the cavity, the light reflected from the reflective portions being transmitted to a beam combiner disposed proximate the cavity of the body via a pair of optical output fibers, light transmitted by the optical output fibers being combined in the beam combiner and transmitted over a second optical fiber to another wavelength splitter disposed proximate the light source and light detectors, this other wavelength splitter splitting the light into two beams which are detected by the light detectors, whereby the transmission of light from the light source to the light detectors is affected by the alternate flexing of the cavity wall and produces an alternating electrical output of the light detectors, the frequency of the alternating electrical output being proportional to the velocity of the fluid flowing in the conduit past the body.

12. The flowmeter of any of claims 9–11 wherein the body is unitary and the cavity and recessed portion of the body are formed by machining of the body.

13. The flowmeter of any one of claims 9–11 wherein the conduit includes an opening formed along a radius thereof for receiving the cavity portion of the body and wherein the recessed portion of the body is arranged within the conduit and in contact with the fluid.

14. The flowmeter of any one of claims 9–11 wherein the portion of the body within the conduit has a generally T-shaped cross-section in a plane parallel to the direction of fluid flow in the conduit, with the head of said T-shaped section arranged substantially perpendicular to the direction of fluid flow in the conduit to present a blunt surface thereto and the upright portion of said T-shaped section arranged substantially parallel to the direction of fluid flow in the conduit.

15. The flowmeter of claim 14 wherein said upright portion of said T-shaped section includes two circular recessed sections formed on opposite sides of the upright portion and proximate the wall of the cavity portion.

* * * * *